(12) United States Patent
Coriale

(10) Patent No.: US 7,701,596 B2
(45) Date of Patent: Apr. 20, 2010

(54) IMAGE FORMING DEVICE DIAGNOSTICS USING SERVED APPLETS

(75) Inventor: Matthew Christopher Coriale, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1571 days.

(21) Appl. No.: 10/879,946

(22) Filed: Jun. 28, 2004

(65) Prior Publication Data

US 2005/0286073 A1 Dec. 29, 2005

(51) Int. Cl.
G06K 15/00 (2006.01)
G06F 3/12 (2006.01)

(52) U.S. Cl. ...................................... 358/1.14; 358/1.15

(58) Field of Classification Search ................. 358/1.15, 358/1.14, 1.13, 1.1, 1.6, 1.9, 1.16, 1.17, 1.18, 358/400, 407, 468, 1.2, 1.5, 1.11, 437, 1.3; 399/8, 9, 18, 19, 20, 21, 37, 94, 176, 279, 399/320, 400; 347/1, 2, 3, 5, 14, 23; 710/18, 710/19, 15, 64, 62; 380/55, 243; 709/218, 709/219, 203
See application file for complete search history.

(56) References Cited

U.S. PATENT DOCUMENTS

| | | |
|---|---|---|
| 5,946,458 A | 8/1999 | Austin et al. |
| 6,003,078 A | 12/1999 | Kodimer |
| 6,020,973 A | 2/2000 | Levine et al. |
| 6,230,189 B1 | 5/2001 | Sato et al. |
| 6,424,427 B1 | 7/2002 | Herriot |
| 6,429,952 B1 | 8/2002 | Olbricht et al. |
| 6,453,127 B2 | 9/2002 | Wood et al. |
| 6,473,788 B1 | 10/2002 | Kim et al. |
| 6,499,114 B1 | 12/2002 | Almstead et al. |
| 6,519,050 B1 | 2/2003 | Eintracht et al. |
| 6,535,297 B1 | 3/2003 | Steele et al. |
| 2001/0055492 A1* | 12/2001 | Wood et al. ................. 399/8 |
| 2003/0090712 A1* | 5/2003 | Lenz et al. ................. 358/1.15 |
| 2004/0073654 A1* | 4/2004 | Sarma ................. 709/224 |
| 2006/0056871 A1* | 3/2006 | Kim ................. 399/81 |

* cited by examiner

*Primary Examiner*—Dov Popovici

(57) ABSTRACT

An image forming device includes a web server, and serves applets to a communicatively coupled computer. The applets execute on the computer, and control one or more operations and/or monitor one or more conditions or sensors in the image forming device. An applet may provide detailed instructions to the computer user as a diagnostic program executes on the image forming device. A list of available applets may be served to the computer, and one or more applets served in response to a user's selection from the list. A decision tree may be served, and one or more applets served as the user advances through the decision tree. Serving the diagnostic applets from the image forming device alleviates the need for a field repair technician to carry a large suite of diagnostic software to diagnose and repair a plurality of models, years, and configurations of image forming devices.

25 Claims, 4 Drawing Sheets

IMAGE FORMING DEVICE DIAGNOSTICS USING SERVED APPLETS

BACKGROUND

The present invention relates generally to the field of image forming devices and in particular to a method of implementing diagnostics using served applets.

Image forming devices, such as printers, copiers, plotters, and the like, are increasingly complex, comprising a compact and highly integrated blend of electrical, electronic, mechanical, optical and thermal systems. Each manufacturer typically produces a plurality of models of a given type of image forming device, to address different price and performance requirements. As the technologies behind the image forming devices continue to evolve, each of these models is typically upgraded periodically to incorporate the latest technology. Finally, many models of image forming devices are highly configurable, and the same model may include different subsystems or peripherals added by the user. The result is a confusingly broad array of different image forming devices deployed in the field.

Like all complex electro-mechanical systems that are subject to heavy use, image forming devices are prone to occasional malfunction, requiring diagnostics and repair. The grouping of many functions within an image forming device into Field Replaceable Units (FRUs) simplifies repair, often allowing users to repair their own image forming devices by simply ordering and substituting a replacement FRU for a defective one. However, an intelligent diagnostic and troubleshooting of the image forming device is often necessary to isolate a fault or malfunction to a given FRU.

Traditionally, image forming device field repair technicians must carry extensive technical reference material, including specifications and diagnostic procedures for each configuration of each model and year of image forming device supported. Additionally, the repair technician must maintain a large suite of diagnostic software and select the appropriate program for the model, year, and configuration of a given image forming device. The requirement that field repair technicians maintain large technical database and large suites of diagnostic software complicates the repair process, requires more extensive training of field repair technicians, and increases the likelihood that the required technical data or software for a particular image forming device in need of repair may be missing—all of which increase the cost of repair and potential down-time of malfunctioning image forming devices.

SUMMARY

The present invention relates to a method of diagnosing a image forming device having a web server. The web server is accessed via a web browser running on a computer communicatively coupled to the image forming device. A software module is downloaded from the image forming device web server to the computer, and the software module is executed on the computer, the software module controlling at least one operation in the image forming device.

In another aspect, the present invention relates to an image forming device. The image forming device includes a communication interface and a processor controlling the communication interface and executing applications. The image forming device additionally includes memory operatively coupled to the processor and storing at least one applet, and a web server application serving the applet to a host computer connected to the image forming device via the communication interface, the applet controlling at least one operation in the image forming device when executed on the host computer.

In yet another aspect, the present invention relates to a method of facilitating repair of an image forming device having a processor and a web server. A diagnostic program is executed on the processor. A software module is served to a computer communicatively coupled to the image forming device by the web server, the software module instructing a user of the computer to repair the image forming device in response to the diagnostic program, when executed on the computer.

In still another aspect, the present invention relates to a method of diagnosing an image forming device having a processor and a web server. A list of available diagnostic software modules is served to a computer communicatively coupled to the image forming device by the web server. A user selection of one or more the software modules is accepted. A selected software module is served to the computer, the software module controlling at least one operation in the image forming device when executed on the computer.

In still another aspect, the present invention relates to a method of diagnosing an image forming device having a processor and a web server. A diagnostic decision tree is served to a computer communicatively coupled to the image forming device by the web server. Indications by a user of the computer are accepted as successive steps of the decision tree are completed. At least one software module is served to the computer in response to the user's position in the decision tree, the software module controlling at least one operation in the image forming device when executed on the computer.

DETAILED DESCRIPTION

According to the present invention, a web server in the image forming device serves one or more software modules to an attached host computer, the software module in turn controlling some operation and/or monitoring some condition in the image forming device, to facilitate diagnostics and repair thereof. The software module is preferably a device-independent executable applet, such as an applet written in the JAVA programming language developed and promulgated by Sun Microsystems, Inc.

By maintaining diagnostic and validation applets in the image forming device itself, the field repair technician need not maintain a suite of software to ensure that he or she has the proper software for diagnosing a large plurality of models of image forming devices. Additionally, as new functionality is added to a particular model of image forming device, its diagnostic and validation applets may concomitantly be upgraded to include, address and test the new functionality. Finally, the provision of diagnostic and validation applets served from the image forming device simplifies the troubleshooting and repair process, and may in many cases alleviate the need for a service call, allowing the user to isolate a fault to an FRU.

Figure 1:
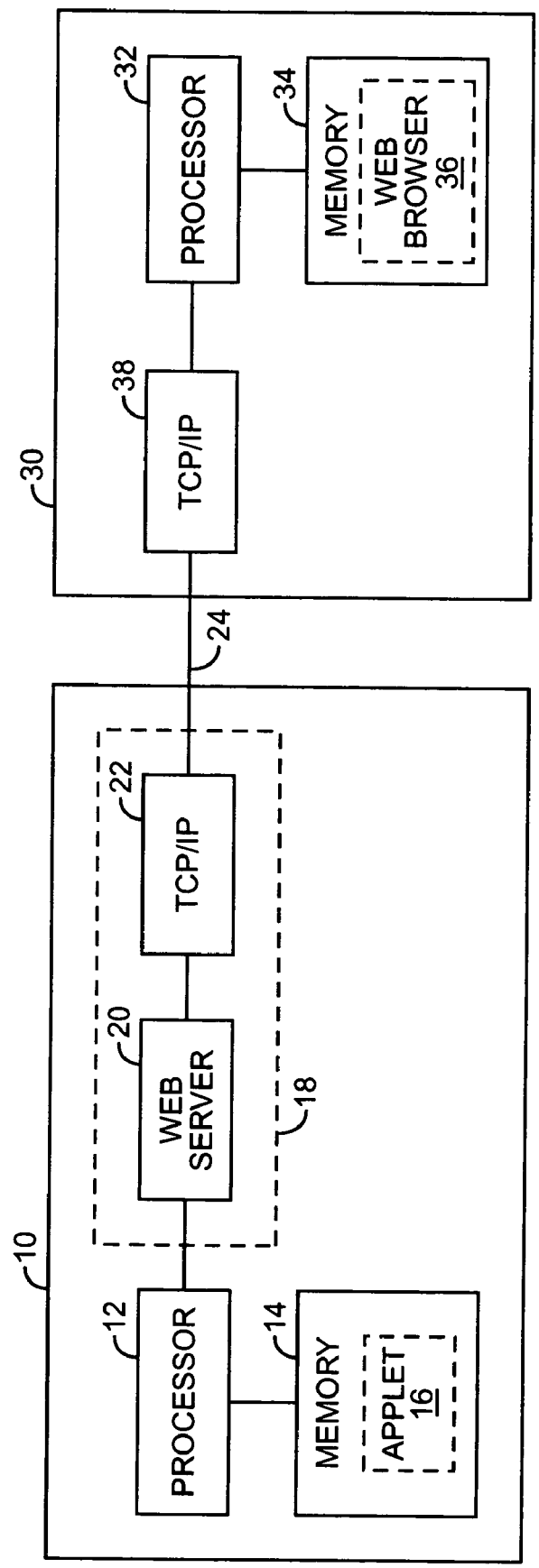
FIG. 1 is a block diagram of an image forming device and an attached host computer.

FIG. 1 depicts a block diagram of an image forming device 10 according to the present invention. The image forming device 10 includes a processor 12, memory 14 containing one or more applets 16, and a communications interface 18. The communications interface 18 includes a web server 20 and a hardware interface 22 providing communications according to a standard protocol, such as TCP/IP. The block diagram of the image forming apparatus 10 of FIG. 1 is functional in nature, and those of skill in the art will recognize that a variety of implementations are possible. For example, the web server 20 may be implemented as a software module in memory 14, executed by the processor 12.

The image forming device 10 is communicatively coupled via communication channel 24 to a host computer 30. The communication channel 24 may comprise a wire or optical cable or wireless (e.g., optical or RF) interface directly connecting the image forming device 10 to the host computer 30. Alternatively, the communication channel 24 may comprise a network, such as a local area network (e.g., Ethernet, token ring, FDDI, WiFi, Bluetooth or the like) or a wide area network (such as the Internet).

The host computer 30 may comprise any computer or terminal as well known in the art. A representative host computer 30 may include a processor 32, memory 34 containing a web browser application 36 that executes on the processor 32, and a hardware communications interface 38 operative to communicate with the communication channel 24, such as via the TCP/IP protocol. While not depicted in FIG. 1, the host computer 30 includes a user interface as is conventionally known, including for example a display operative to display text and/or a Graphical User Interface (GUI), and input devices such as a keyboard, mouse or the like.

According to the present invention, a user (which may be a field repair technician or a user of the image forming device 10) accesses the web server 20 in the image forming device 10 via a web browser 36 running on the host computer 30. To effect this, the user may direct the web browser 36 to a URL, network address, file, or other target that resolves to the web server 20 in the image forming device 10, as known in the art. In one embodiment, for security and to preclude potentially malicious access, the web server 20 may require the user to provide a predetermined password to access the diagnostic applets of the present invention.

Upon successfully accessing the web server 20 in the image forming device 10, the user may download one or more applets 16 from the image forming device 10 to the host computer 30, and execute the applet(s) on the processor 32. Each applet then directs commands through communications channel 24 to the processor 12 of the image forming device 10, controlling operations and/or accessing sensors in the image forming device 10. Note that the applet may access the processor 12 via the web server 20, such as if the applet comprises a script that the web server 20 interprets, such as a Java script. Alternatively, the applet may access the processor 12 directly, such as if the applet comprises an independent module such as a Java applet running on the host computer 30.

As and example of an applet controlling an operation and/or accessing a sensor in the image forming device 10, an applet may actuate a drive roller and then read the position of the drive roller, such as by monitoring the output of a shaft encoder. As another example, an applet may monitor the paper path switches as the image forming device moves paper through all or part of a paper path. As yet further examples, an applet may command a fuser to a predetermined temperature and monitor the temperature of the fuser via a thermal sensor; monitor and control power supplies and voltage settings; allow various diverters to be moved under user control and monitor their status or subsequent image forming device operations; and the like. All these examples are illustrative only, and do not limit the scope of applets according to the present invention. Monitored sensor outputs and other status are transmitted by the processor 12 through the communications channel 24 to the host computer 30, which may display the outputs to the user. Additionally or alternatively, the applet may compare the sensor outputs to predetermined values, and take further diagnostic actions based on the results.

Figure 2:
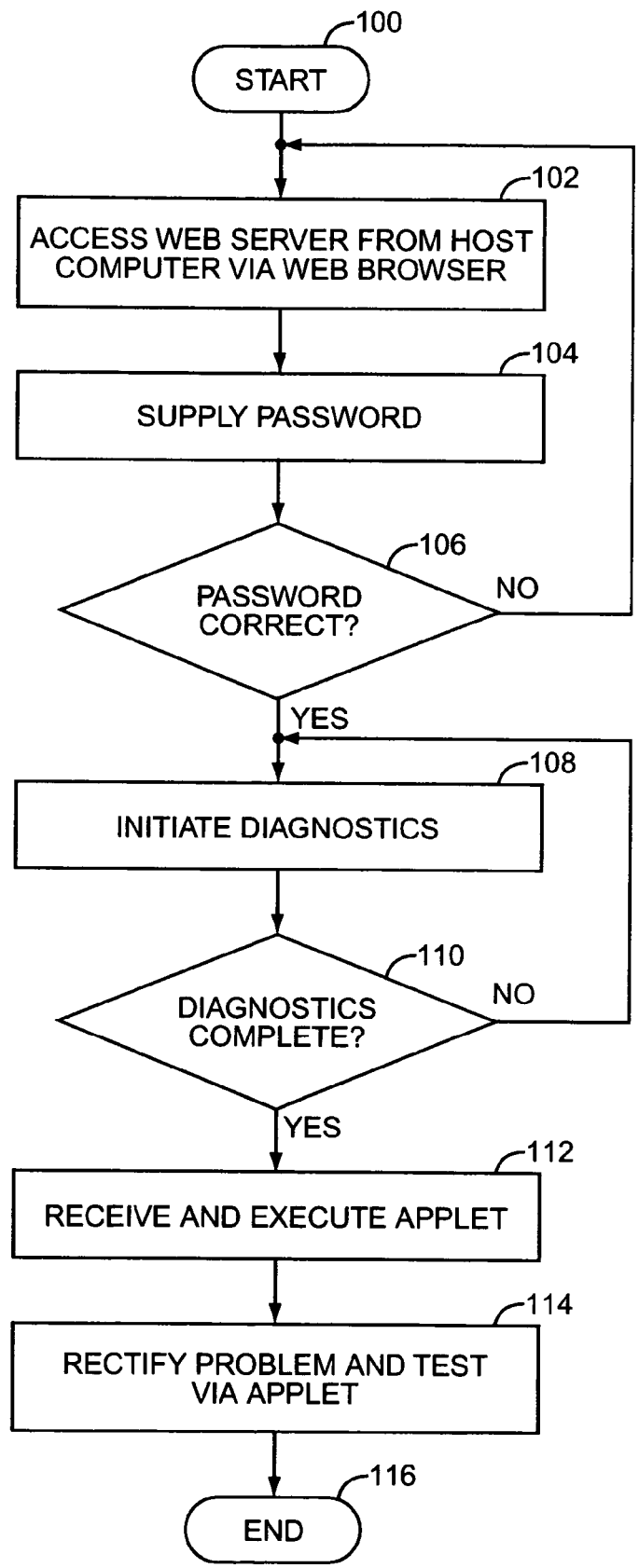
FIG. 2 is a flow diagram of a method of automated diagnostics.

The sophistication and capabilities of the served applet may vary widely according to the present invention. In one embodiment, depicted in FIG. 2, the applet works in conjunction with self-diagnostic software executing on the processor 12 of the image forming device 10. Beginning at step 100, a user accesses the web server 20 in the image forming device 10 from a host computer 30 via a web browser 36 running thereon, as depicted at step 102. As described above, the user may be required to supply a predetermined password, as depicted at step 104. If the web server 20 determines that the password is correct, at step 106, the processor 12 in the image forming device 10 initiates a self-diagnostic program, as depicted at step 108. If the user password is incorrect at step 106, the web server 20 refuses access, and diverts control back to the start 100.

The diagnostics performed at step 108 by the processor 12 may comprise an arbitrarily complex series of controlling individual functions and operations in the image forming device 10, and validating their successful completion via monitoring sensors. Alternatively, the self-diagnostics may comprise consulting a log of previously stored malfunctions and aberrations to determine one or more malfunctions. Once the diagnostics procedure is complete, as indicated at step 110, the web server 20 serves an applet to the host computer 30 that instructs the user, in great detail, how to remedy the specific problem or malfunction detected. This may, for example, include instructions, diagrams, photographic images, animations depicting sequential repair steps, and the like. The user may then follow these instructions to repair the image forming device 10, such as replacing an FRU, clearing a detected jam, resetting a subsystem or component, or the like. Following repair by the user, the applet may then command the image forming device 10 to initiate actions and monitor the results, to verify the repairs. When the repair is complete, the applet terminates, freeing up resources in the host computer 30, and the user may terminate communication with the web server 20 by terminating the web browser 36, or directing the web browser elsewhere, as indicated at step 116.

Figure 3:
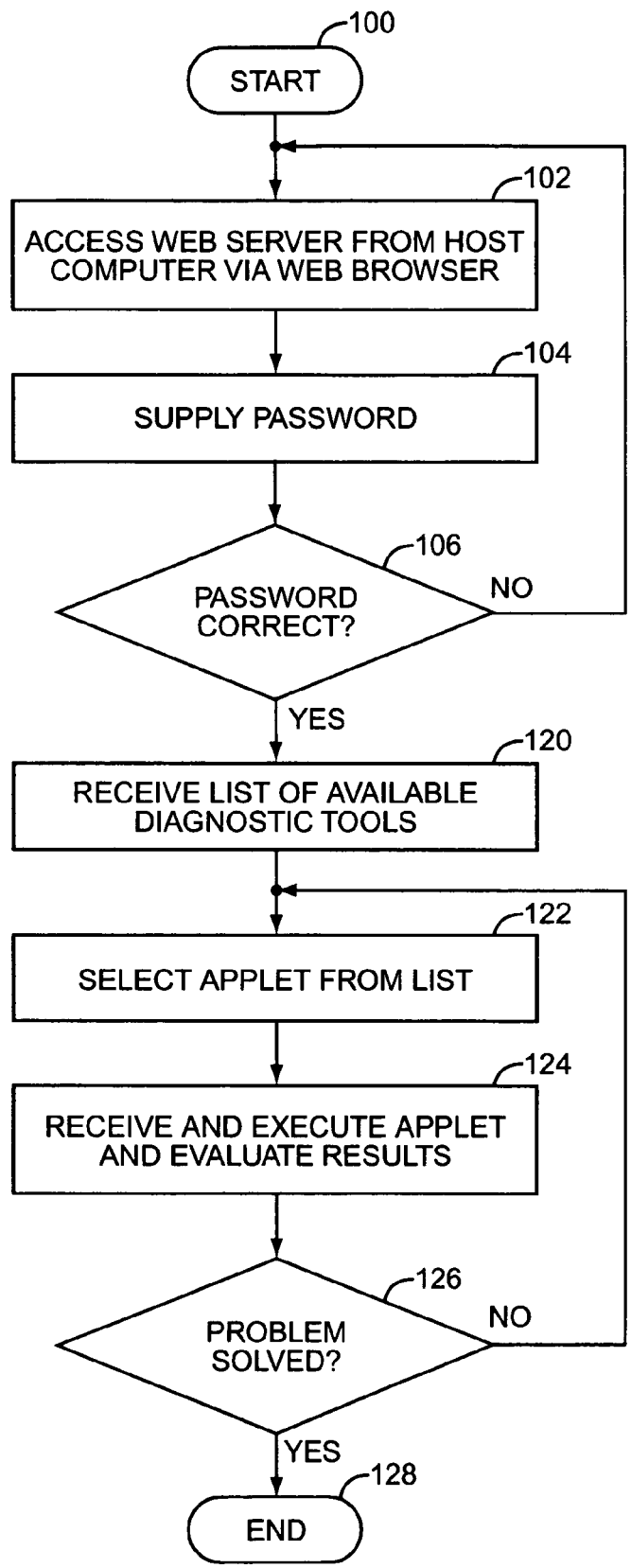
FIG. 3 is a flow diagram of a method of selected diagnostics.

Another embodiment of the present invention is depicted in flow diagram form in FIG. 3. A user accesses the web server 20 in an image forming device 10 from a web browser 36 running on a host computer 30, optionally by supplying a password, as described above and with reference to steps 100, 102, 104, and 106. At step 120, the user receives from the web server 20 a list of available diagnostic tools, for example displayed in the web browser 36. The user, such as a field repair technician, may then selectively choose one or more applets to diagnose the image forming device 10, as indicated at step 122. Upon selecting each applet, the web server 20 serves the applet to the host computer 30. The host computer 30 receives the applet and executes the applet on the processor 32, as indicated at step 124. The applet may control one or more operations on the image forming device 10 and/or monitor one or more conditions or sensors, as described above. As each applet completes successfully, the user may select another applet to download and execute, to test, diagnose, or monitor another function or subsystem of the image forming device 10, as indicated at step 126. When the user has isolated and repaired the problem, and optionally tested the image forming device 10, the process terminates, as indicated at step 128.

Figure 4:
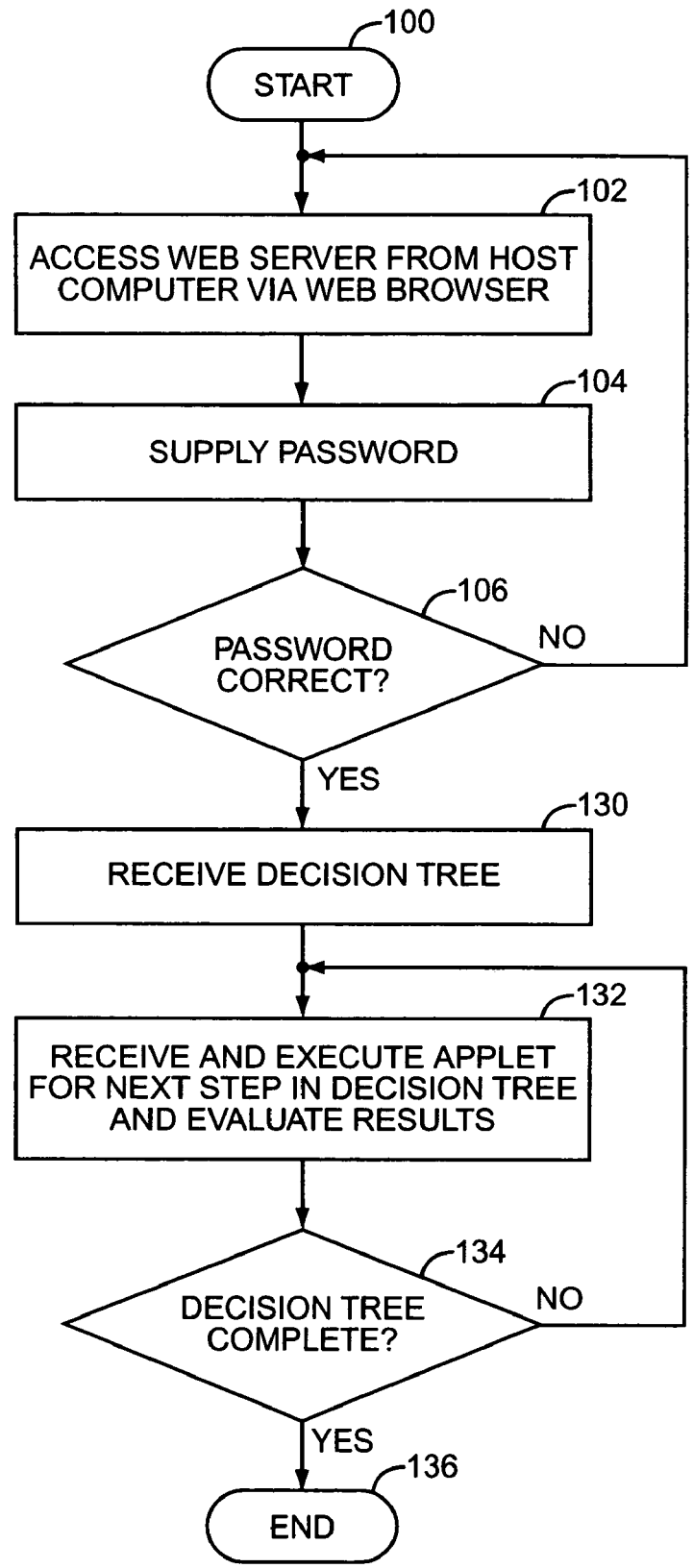
FIG. 4 is a flow diagram of a decision tree method of diagnostics.

Yet another embodiment of the present invention is depicted in flow diagram form in FIG. 4. A user accesses the web server 20 in an image forming device 10 from a web browser 36 running on a host computer 30, optionally by supplying a password, as described above and with reference to steps 100, 102, 104, and 106. At step 130, the user receives a decision tree from the web server 20, such as displayed in the user's web browser 36. As well known in the diagnostic arts, a decision tree (also known as a diagnostic flowchart) is a predetermined sequence of procedures and/or monitoring steps that, when followed, diagnose a malfunctioning device and result in one or more procedures or recommendations to effect repair. According to the embodiment of the present invention depicted in FIG. 4, as the user steps through the decision tree, the web server 20 may download one or more applets to the host computer 30 to test and monitor one or more successive steps in the decision tree, as indicated at step 134. The user's progress through the decision tree may be displayed in the web browser 36. When the decision tree is complete, the procedure terminates, as indicated at step 136.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of diagnosing and repairing an image forming device having a web server, comprising:
   establishing a communication connection with a computer by the image forming device;
   granting, by said image forming device, access to the web server of the image forming device by the computer over the established communication connection;
   downloading, by the image forming device, a software module from said image forming device web server to said computer over the established communication connection; and
   allowing the computer executing said software module to control at least one operation in said image forming device, wherein the at least one operation comprises repairing a malfunction of the image forming device, and wherein the communication connection is terminated when the repair is complete.

2. The method of claim 1 wherein repairing the malfunction comprises activating a drive roller and monitoring a position thereof.

3. The method of claim 1, wherein repairing a malfunction comprises allowing the computer executing said software module to control a temperature of a fuser in the image forming device and monitor the fuser temperature.

4. The method of claim 1 wherein granting access comprises granting access to said image forming device web server via a web browser running on the computer and receiving a predetermined password to said image forming device web server from the computer.

5. The method of claim 1 wherein said software module comprises an applet independent of any processor and operating system of the computer.

6. The method of claim 1, wherein repairing a malfunction comprises controlling and monitoring at least one of a voltage setting and a power supply in the image forming device.

7. The method of claim 1, wherein establishing, by the image forming device, a communication connection comprises establishing a direct connection with the computer.

8. An image forming device, comprising:
   a communication interface;
   a processor controlling said communication interface and executing applications;
   memory operatively coupled to said processor and storing at least one applet; and
   a web server application serving said applet to a host computer via said communication interface, said applet when executed being capable of controlling at least one malfunction repair operation in said image forming device via the communication interface, the image forming device being a printer such that the communication interface, the processor, the memory and the web server application are contained within the printer.

9. The image forming device of claim 8 wherein said web server application requires a predetermined password from said host computer prior to serving said applet.

10. The image forming device of claim 8 further comprising a diagnostic application executing on said processor to diagnose a malfunction, and wherein said applet served to said host computer by said web server when executed provides instructions to a user of said computer to repair said malfunction, the image forming device further comprising at least one drive roller and at least one encoder associated with the at least one drive roller, and the at least one malfunction repair operation comprising activating the at least one drive roller and reading a position thereof via the at least one encoder.

11. The image forming device of claim 8 further comprising a menu of diagnostic applets for transfer to said host computer by said web server via the communication interface, and wherein one or more said applets are selectively downloaded to said host computer in response to a user selection of said applets via said menu and via the communication interface.

12. The image forming device of claim 11 wherein each said applet when executed exercises and monitors a discrete malfunction repair operation within said image forming device and reports the results to the user via said host computer, the at least one malfunction repair operation comprising controlling a voltage setting in the image forming device.

13. The image forming device of claim 8 further comprising a decision tree for transfer to said host computer by said web server via the communication interface, the decision tree including a diagnostic procedures for the image forming device for controlling the at least one malfunction operation.

14. The image forming device of claim 13, further comprising a fuser assembly, wherein at least one of said diagnostic procedures is performed by an applet downloaded to said host computer by the image forming device via said communication interface, the at least one malfunction repair operation comprising setting a temperature of the fuser assembly.

15. A method of facilitating repair of an image forming device having a processor and a web server, comprising:
   executing a diagnostic program on said processor of the image forming device; and serving, by the web server of the image forming device, a software module to a computer communicatively coupled to said image forming device, said software module including instructions which when executed by the computer addresses at least one malfunction of the image forming device identified by the diagnostic program, wherein the software module include instructions which when executed by the computer provide instructions for remedying the malfunction, and terminating a communication between the image forming device and the computer when remedying the malfunction is complete, the remedying comprising at least one of setting and monitoring a temperature of a fuser in the image forming device, activating a drive roller in the image forming device and monitoring a position thereof, and controlling and monitoring a power supply in the image forming device.

16. The method of claim 15, further comprising:

prior to serving the software module, establishing a communication connection with the computer, wherein the software module is sent to the computer over the established connection, wherein the communication connection comprises a direct connection to the computer.

17. A method of diagnosing and repairing an image forming device having a web server, comprising:

serving, by the web server of the image forming device, a list of available diagnostic software modules to a computer communicatively coupled to said image forming device; and serving, by the image forming device, a selected software module appearing on the list to said computer, said software module including instructions for controlling at least one operation in said image forming device when executed on said computer, wherein controlling at least one operation in said image forming device comprises repairing a malfunction of the image forming device, and terminating a communication between the image forming device and the computer when the repair is complete, the repairing comprising at least one of controlling a fuser and a power supply in the image forming device.

18. The method of claim 17, further comprising:

prior to serving the list, establishing a communication connection with the computer, wherein the list is sent to the computer over the established communication connection.

19. The method of claim 17, further comprising:

prior to serving the selected software module, receiving from the computer a selection of the software module, the software module serving to at least one of test, monitor and diagnose a condition of the image forming device.

20. A method of diagnosing and repairing an image forming device having a web server, comprising:

serving, by the web server of the image forming device, a diagnostic decision tree to a computer communicatively coupled to said image forming device; and serving, by the image forming device, at least one software module to said computer in response to a position in said decision tree, said software module including instructions for controlling at least one operation in said image forming device when executed on said computer, wherein controlling at least one operation in said image forming device comprises repairing a malfunction of the image forming device, and terminating a communication between the image forming device and the computer when the repair is complete.

21. The method of claim 20, further comprising:

prior to serving the diagnostic decision tree, establishing a communication connection with the computer, wherein the decision tree is sent to the computer over the established communication connection.

22. The method of claim 20, further comprising, prior to serving at least one software module, receiving an indication of a procedure of the decision tree to be performed, the procedure being a procedure to perform one of testing, monitoring and diagnosing a condition of the image forming device.

23. The method of claim 20, wherein repairing the malfunction comprises controlling a drive roller in the image forming device and monitoring a position thereof.

24. The method of claim 20, wherein repairing the malfunction comprises controlling and monitoring a power supply in the image forming device.

25. The method of claim 20, wherein repairing the malfunction comprises setting a temperature of a fuser in the image forming device.

* * * * *